United States Patent [19]

Girmay et al.

[11] Patent Number: 5,377,233

[45] Date of Patent: Dec. 27, 1994

[54] SEAM-LESS DATA RECOVERY

[75] Inventors: Girmay K. Girmay, Inglewood; Peter K. Wu, La Palma; Harmik Sarian, Tarzana, all of Calif.

[73] Assignee: Xerox Corporation, Stamford, Conn.

[21] Appl. No.: 108,275

[22] Filed: Aug. 19, 1993

Related U.S. Application Data

[63] Continuation of Ser. No. 756,242, Sep. 6, 1991, abandoned.

[51] Int. Cl.$^5$ .............................................. H03D 3/02
[52] U.S. Cl. .................................. 375/119; 375/106
[58] Field of Search ............... 375/118, 106, 119, 120; 307/510–511, 525, 527; 328/109, 155; 331/1 R, 12

[56] References Cited

U.S. PATENT DOCUMENTS

| | | | |
|---|---|---|---|
| 4,290,022 | 9/1981 | Puckette | 328/109 |
| 4,780,889 | 10/1988 | Ley et al. | 375/119 |
| 4,841,551 | 6/1989 | Avaneas | 375/199 |
| 4,955,040 | 9/1990 | Sarkoezi | 375/119 |
| 5,022,057 | 6/1991 | Nishi et al. | 375/119 |
| 5,058,142 | 10/1991 | Otsuka | 375/119 |
| 5,132,633 | 7/1992 | Wong et al. | 328/155 |

Primary Examiner—Stephen Chin
Assistant Examiner—Young Tse
Attorney, Agent, or Firm—Robert Cunha

[57] ABSTRACT

A circuit for seamlessly printing data from a remote source that is arriving at a clock rate that is equal to the clock rate of the local data, but that has a different clock phase, due to the longer path used by the remote data. The circuit generates a number of local clock phases, compares these phases to the phase of the remote clock, and uses for both local and remote data the clock whose phase is nearest that of the remote clock.

1 Claim, 6 Drawing Sheets

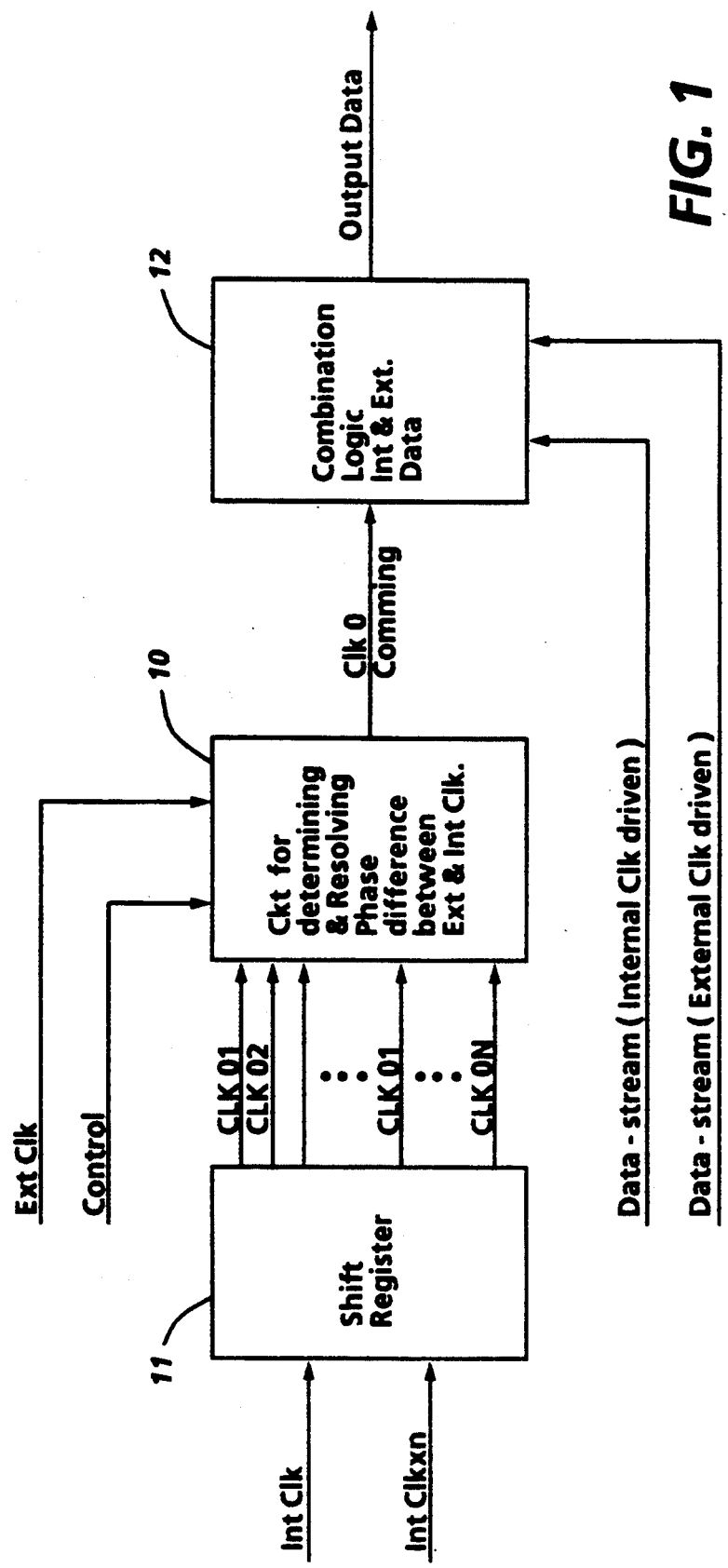

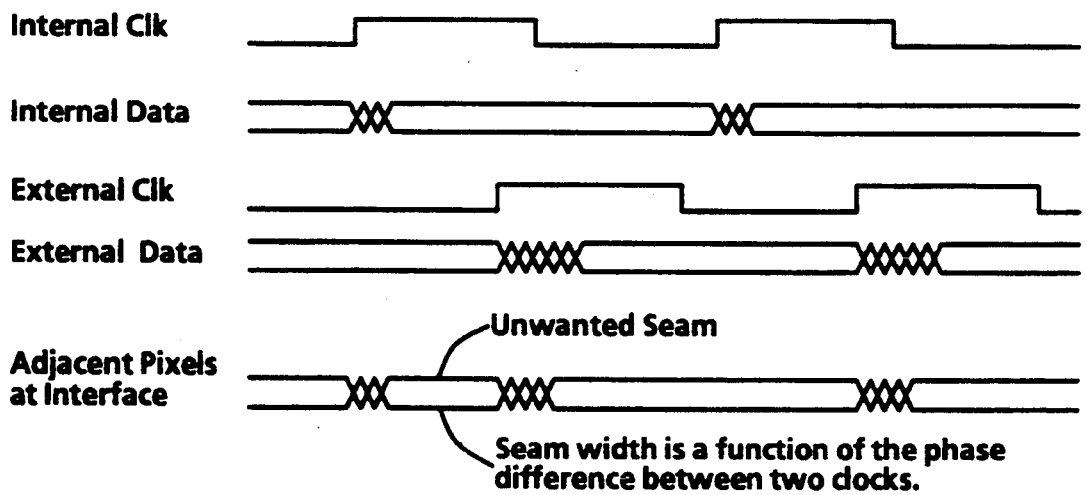
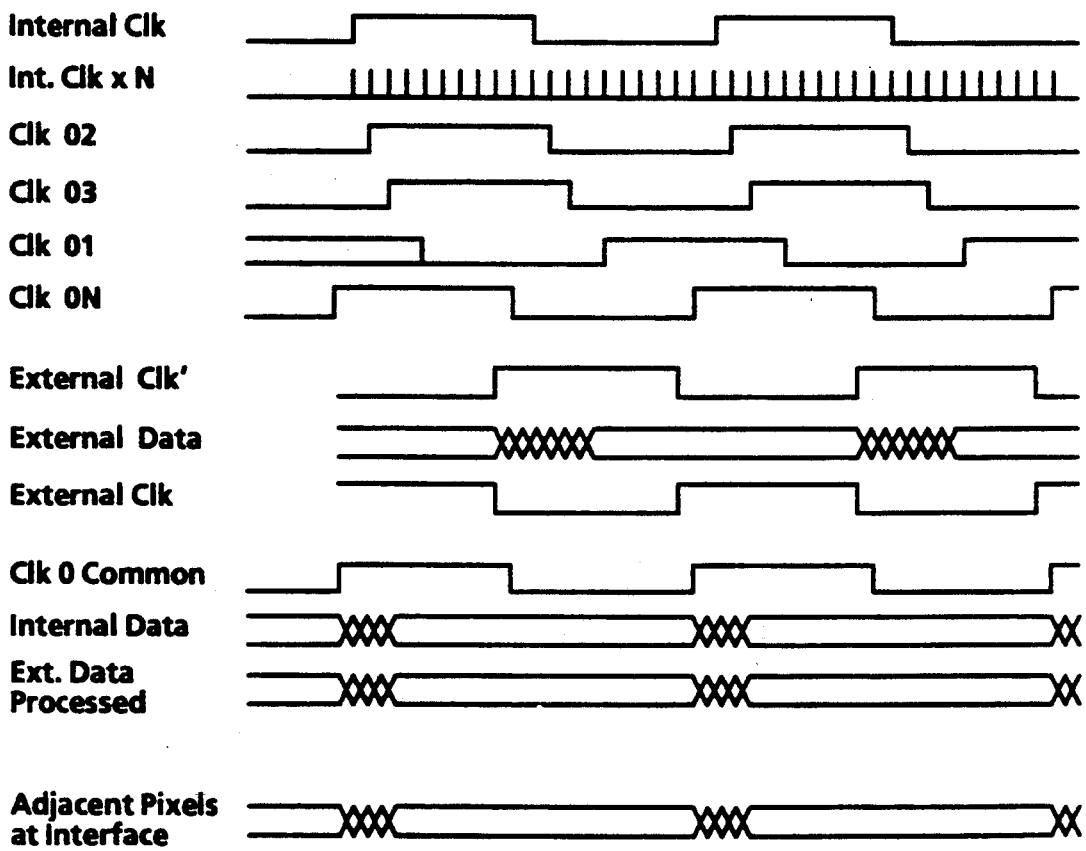
FIG. 3

SEAM-LESS DATA RECOVERY

This is a continuation of application Ser. No. 07/756,242, filed Sep. 6, 1991 now abandoned.

BACKGROUND OF THE INVENTION

This invention is a circuit for resolving the phase difference between data that is locally generated and data that is remotely generated, and more specifically is a circuit for generating a number of clock phases and selecting the one which will process both local and remote data without showing a visible transition line.

In a scanning system, unless the data rate and start points of both locally and remotely generated video are synchronized to the scanner's speed, the resulting video could have a great deal of jitter and noise patterns. The severity of this jitter is judged by the overall print quality of the system. As tighter placements and quality prints are achievable from the rest of the system, the jitter contributions from the data and scanner speed mismatch become significant.

In most Raster Output Scanner (ROS) systems with polygon scanners, a phase locked loop (PLL) is used to synchronize the data pattern from scan to scan. This means that the clock that is utilized to clock in data will vary according to the motor speed and variations from facet to facet, depending on the scheme used.

To guarantee that the data sent by the host is properly received and processed to comply with the variation in the motor speed, the data from the host is read in by sending the clock generated by the PLL to clock-in data from the host. This approach guarantees that each pixel is plotted precisely in the same location from scan line to scan line as long as all the data is imported from a host.

In instances where document generation requires the mixing of internally generated and externally generated data, the existing approach will result in the processing of data with two clock phases, the phase differences of which are dependent on the cable length and the paths the clock had to go through before it is returned to the printer.

Unfortunately the cable length can vary from system configuration to system configuration and the clock delay path can vary from board to board, thereby excluding a possible approximation and predictive compensation for the phase delays.

In the specific application of this system, the white margin is generated using an internal clock, but the externally generated data is clocked in by the returning clock which takes over as the data arrives. The margin is programmable to compensate for ROS internal variables in terms of document placement. When this is done using the existing prior art approach, the result is a maximum uncertainty of ±1 pixel of jitter at the interface between internally and externally generated data. This, in turn, results in partially exposed pixels at the margins.

In a black and white printer, this is not significant. It may not be noticed if the first line of a page or the first pixel on every line is a shade of gray rather than a clear black or white pixel. However, in a tri-state printer using two colorants, where a line of partially exposed pixels may appear, for example, as a pink line on an otherwise black and white document, this is clearly visible as a system error. In fact, this color error may also happen in the middle of the page, where jitter will result in partially exposed, and therefore off-color, pixels. What is needed is a circuit that can resolve differences in clock phases and prevent clock jitter.

SUMMARY OF THE INVENTION

This problem is solved by recognizing two fundamental characteristic relationships between the internal clock and the return clock. 1) The return clock is always a certain phase delay of the internal clock, and 2) the clock rate variation of either clock is very small as compared to the clock rate.

After the motor has been allowed to reach its nominal speed and after all self diagnostics have been checked to be normal, or any time failures related to clock reception or data corruption are detected, a synchronizing signal is generated, enabling a circuit shift register to generate N phases of the clock, each output being 360/N degrees apart. As soon as the first return 'External clock' is received, one of the N phases closest to the external clock is selected and latched. The implementation described herein utilizes the Phase following the 'External Clock', but it is also capable of selecting the phase just before the 'External Clock' and this may be appropriate, depending on the relationship between the external data and clock.

This latched clock phase is used for processing the internal and external data streams. As a result, any data, internally or externally generated, will be placed precisely, without compromising the advantages gained by the tracking of the motor speed using a PLL, and the interface between external and internal data streams will be processed without any visible flaws.

BRIEF DESCRIPTION OF THE DRAWINGS

FIG. 1 is a block diagram of the circuit.
FIG. 3 is a timing diagram.

DETAILED DESCRIPTION OF THE INVENTION

As shown in FIG. 1, the internal, or local, clock, Int Clk, is applied to a shift register 11 which can generate any number of phase shifted clock pulse trains, each one a predetermined amount later in phase. All of these are applied to a logic circuit 10 which compares all of these to the external, or remote, clock, Ext Clk. The logic circuit 10 is arranged so that the phase shifted clock pulse train which is closest in phase to the external clock will be chosen to be used for both external and internal data. Finally, both sets of data will be clocked through the combination logic 12 under control of the selected clock from circuit 10.

Figure 2A:
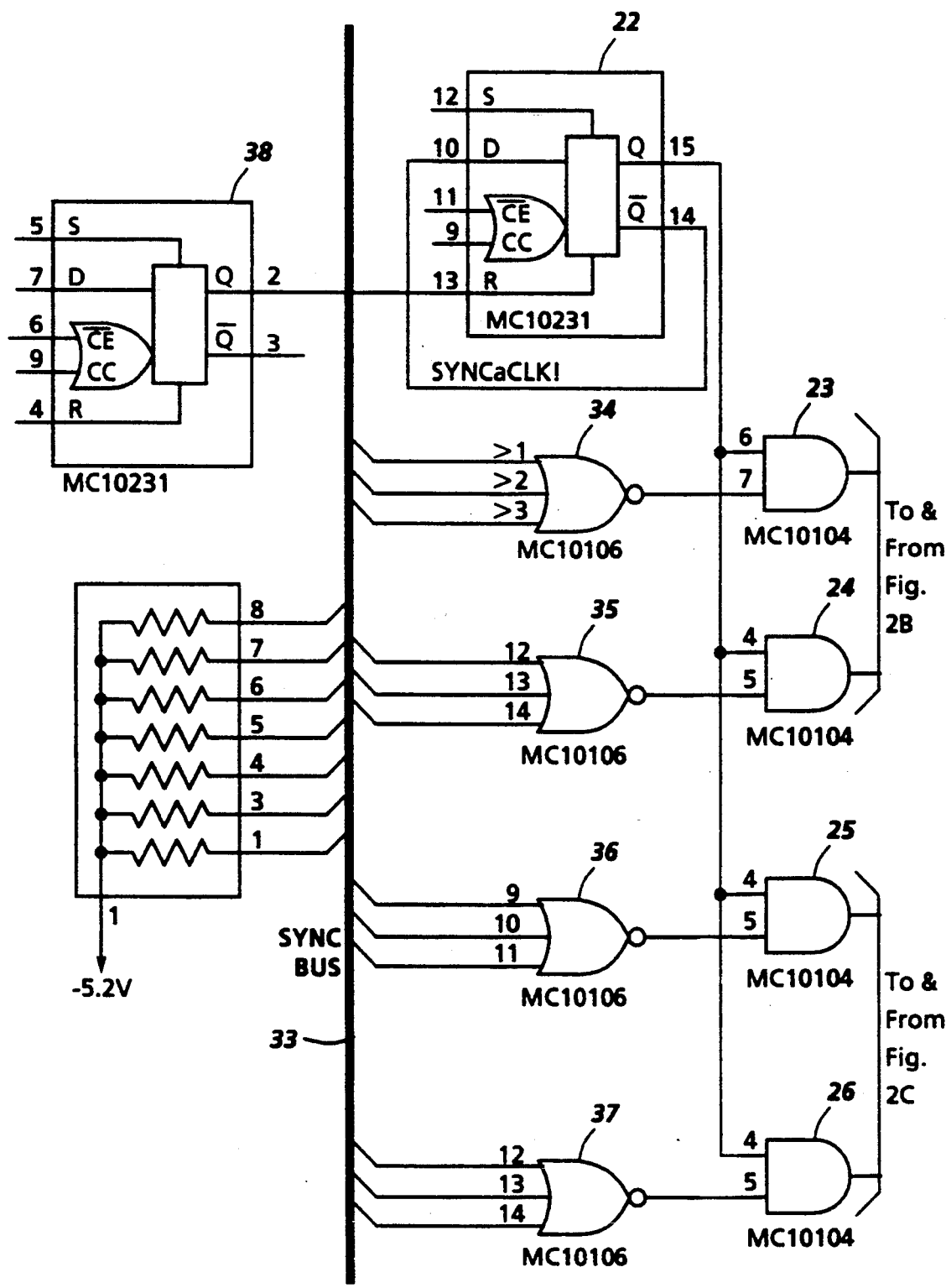
FIG. 2 is a schematic diagram of the circuit.
Figure 2B:
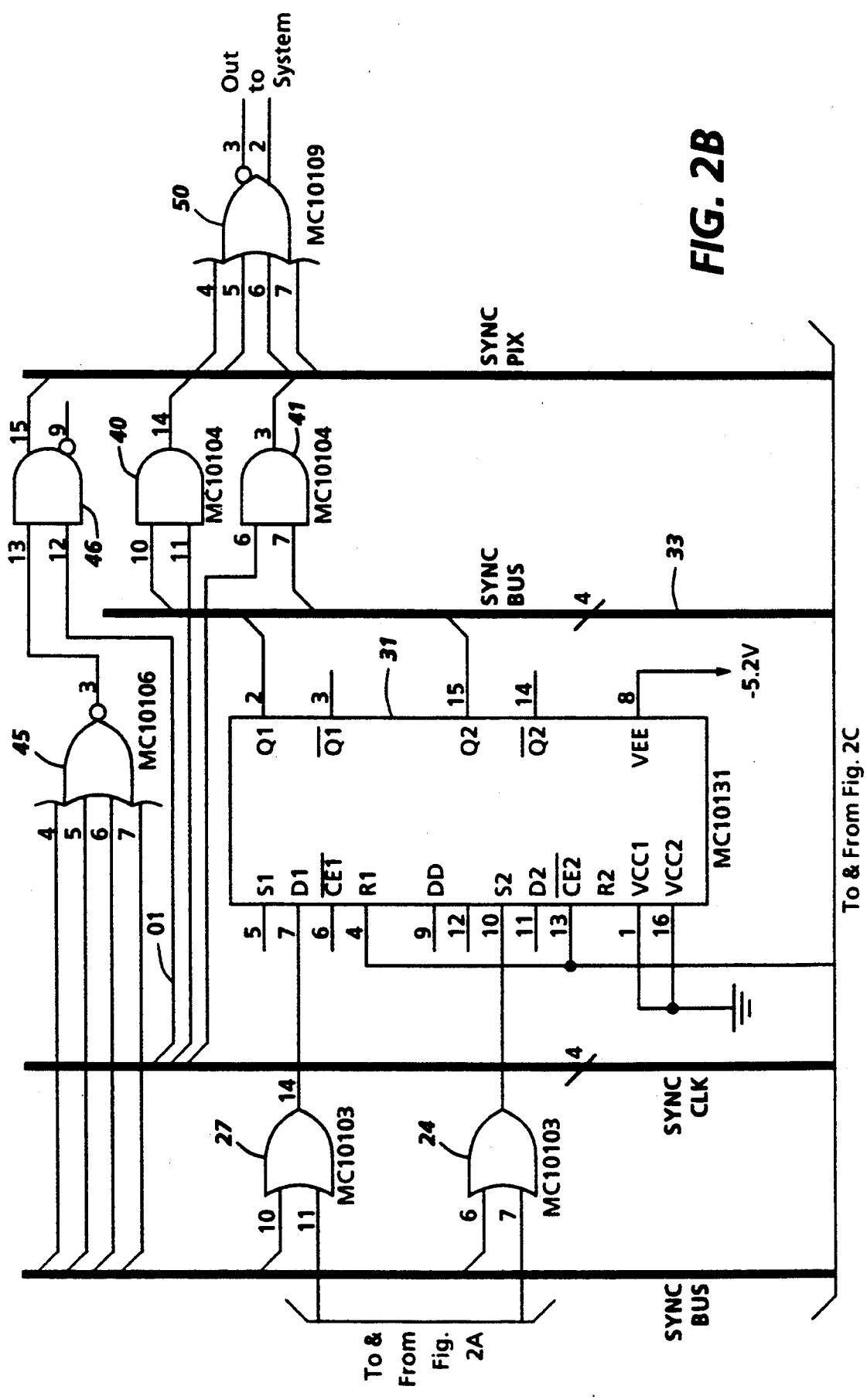
Figure 2C:
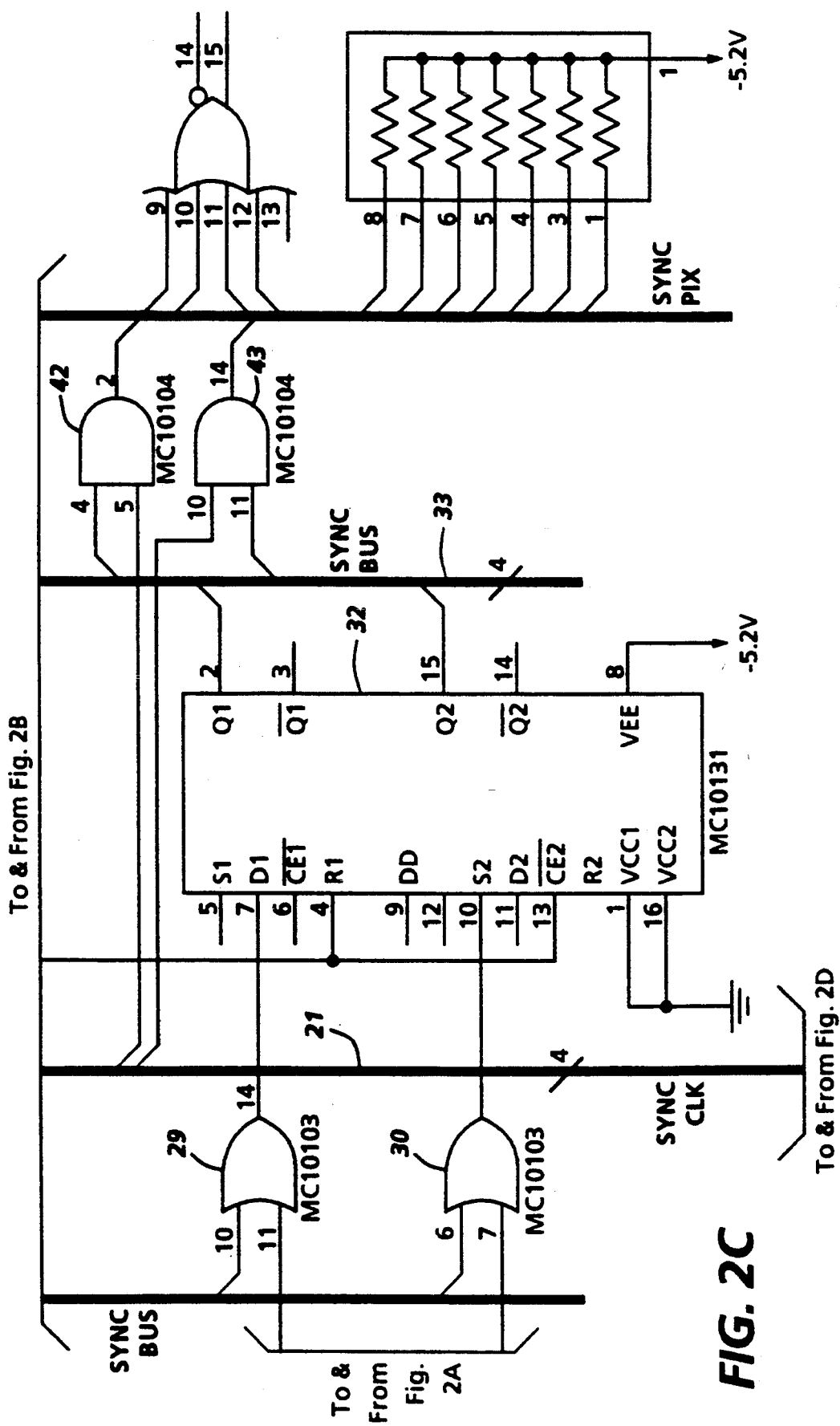
Figure 2D:
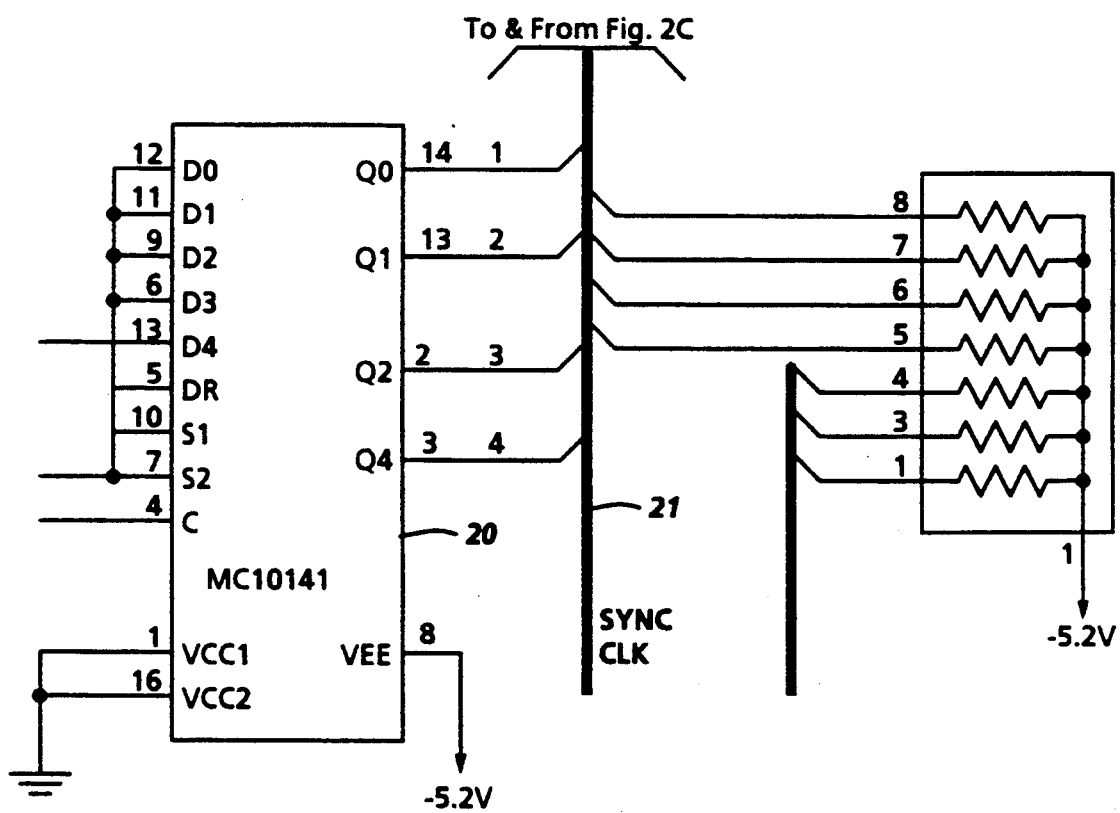

FIG. 2 is the detailed schematic diagram of the circuit. At system start-up, latch 38, pin 5, is set high, setting the latch 38 output high. Also at this time, the gate 45 output is forced high, thereby allowing phase 1 to be output by gate 46, to be used as the video clock until such time as the appropriate clock is chosen. Note that any phase could have been used as the default phase by connecting that signal rather than the phase 1 clock to gate 46, pin 12.

Latch 38, pin 5, is driven to a low level after assuring a predictable startup of the system. This triggers the internal checking of the functionality and readiness of all critical components of the ROS system. Only after this has been achieved will the latch 38, pin 7, be allowed to change to a 'LOW' level. For the application in this circuit a pin 7='LOW' indicates that the PLL has achieved lock and that the motor has reached required speed. After pin 7 is set to a 'LOW' logic level the first 'LOW' to 'HIGH' transition of the latch 38 output will remove the reset from flip-flop 22, pin 13. As soon as the first external clock is received on pin 11, the 'Q' output of flip flop 22 pin 15 changes from a 'LOW' to a 'HIGH'. Since all the 'SYNC BUS' signals are at a 'LOW', the signals on the outputs of gates 23–26 are all 'HIGH' resulting in all outputs of gates 27–30 being high. Also, latches 31, 32 will be reset and all outputs will be low. The SYNC BUS is shown in three sections in this figure. Thus, the latch 31, 32 outputs will be coupled to the OR gates 34 through 37, which will have high outputs.

The internal clock is applied to shift register 20 producing four new clocks that differ in phase, and these are applied to the four latches in two packages 31, 32. The first one of these clocks that goes high after the external clock went high will trigger the latch it is connected to, and that one output will go high. For an example, let us assume that the second clock is selected, and therefore that the second latch, the lower half of latch 31, went high. This output will be connected to gates 34, 36 and 37, but not gate 35. Therefore, gates 34, 36 and 37 will now have low outputs and gate 35 will be the only one with a high output. Then, the output of gates 23, 25–27, 29 and 30 will go low and the output of gates 24 and 28 will remain high.

All four generated phases of the internal clock are connected to gates 40–43 and the one high latch 31, 32 output will select one of these gates to output the correct clock through gate 50 to the remainder of the system.

This schematic utilizes ECL devices and the associated pull down resistors, since ECL devices are open emitter drivers and a pulldown resistor is required for driving logic 'LOW' levels.

FIG. 3 shows the timing relationships of the various signals. In this figure, the basic Internal Clock can be split into ten phases by using the higher frequency "Int Clk XN" which has a frequency ten times higher than the Internal Clock. These phases are shown specifically as Clock Phases 2, 3 and 4, Phase i, and the last one, Phase N. The External Clock is shown as arriving at a random phase such that its rising and falling edges fall between the pulses of the Internal Clock XN. The circuit will then select the Clock Phase that transitions at the next Internal Clock XN, which is shown as the Common Clock. The Data is also shown in this diagram, consisting of an unstable period during which the data transitions to its high or low value and a time during which the data is either stable high or low. The data is clocked in at the time that the clock pulses go from high to low. Notice that the Internal Data may arrive earlier than the External Data by a certain amount but that both will be reliably clocked by the newly created Common Clock.

In the schematic implementation shown, the internal clock is 12 MHz and thus a $4 \times 12$ MHz=48 MHz clock is used to drive the shift register 20 clock input. The outputs from this shift register are 12 MHz with phase delays that are multiples of 90 degrees.

This innovative approach to data recovery solves the problem identified earlier. In addition, it furnishes the following benefits:

(1) Once a phase has been identified as the appropriate optimal positioning for the clocking of the data, any clock corruptions of the return clock are inherently harmless.

(2) This scheme can be used in asynchronous data communication schemes where multiple samplings of incoming data at a higher frequency clock than the transmitting clock rate are made, and a majority poll is used to decide what the logic level is.

In such schemes, this portion of the circuit could be used to look at the incoming data at the multiple phase delays and determine the center of the data frame. Once this is done, a single clocking approach or fewer sampling approaches can be achieved.

When used in this configuration, pattern sensitivity and transition jitters will have been eliminated.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

We claim:

1. A circuit for generating one output data stream from first and second input data streams and first and second input clocks, comprising:

means for generating a number of new clocks from said first clock, each new clock having the same frequency as said first clock but each new clock being different in phase, means for comparing said number of new clocks against said second input clock to select one of said number of new clocks that is closest in phase to said second clock, and means for using said selected one of said number of new clocks to generate said output data stream from said first and second input data streams.

* * * * *